United States Patent
Keesara et al.

(10) Patent No.: US 8,675,658 B2
(45) Date of Patent: Mar. 18, 2014

(54) USING MULTIPLE IGMP QUERIERS IN A LAYER 2 NETWORK

(75) Inventors: Srikanth Keesara, Tewksbury, MA (US); David Johnson, Jr., North Andover, MA (US); Rama S. Appalla, Nashua, NH (US)

(73) Assignee: Avaya Inc., Basking Ridge, NJ (US)

( * ) Notice: Subject to any disclaimer, the term of this patent is extended or adjusted under 35 U.S.C. 154(b) by 93 days.

(21) Appl. No.: 13/305,305

(22) Filed: Nov. 28, 2011

(65) Prior Publication Data

US 2013/0136122 A1 May 30, 2013

(51) Int. Cl.
*H04L 12/56* (2011.01)
(52) U.S. Cl.
USPC .............................. 370/392; 370/230; 370/401
(58) Field of Classification Search
USPC ......... 370/390, 229, 230, 235, 236, 238, 252, 370/351, 392, 401, 230.1, 312, 389
See application file for complete search history.

(56) References Cited

U.S. PATENT DOCUMENTS

| | | | | |
|---|---|---|---|---|
| 6,654,371 | B1* | 11/2003 | Dunstan et al. | 370/390 |
| 6,977,891 | B1* | 12/2005 | Ranjan et al. | 370/229 |
| 7,512,146 | B1* | 3/2009 | Sivasankaran et al. | 370/432 |
| 7,881,477 | B2* | 2/2011 | Li | 380/278 |
| 2002/0120769 | A1* | 8/2002 | Ammitzboell | 709/238 |
| 2002/0122390 | A1 | 9/2002 | Garff et al. | |
| 2002/0150094 | A1* | 10/2002 | Cheng et al. | 370/389 |
| 2003/0123453 | A1* | 7/2003 | Ooghe et al. | 370/395.53 |
| 2006/0146823 | A1* | 7/2006 | Ding | 370/390 |
| 2006/0268869 | A1 | 11/2006 | Boers et al. | |
| 2007/0127459 | A1* | 6/2007 | Lo et al. | 370/389 |
| 2009/0037607 | A1* | 2/2009 | Farinacci et al. | 709/249 |
| 2010/0061269 | A1* | 3/2010 | Banerjee et al. | 370/254 |
| 2010/0098086 | A1* | 4/2010 | Fromm et al. | 370/392 |
| 2010/0272108 | A1* | 10/2010 | Mack-Crane et al. | 370/392 |
| 2011/0158208 | A1 | 6/2011 | Solanki et al. | |

FOREIGN PATENT DOCUMENTS

WO WO9848343 10/1998

OTHER PUBLICATIONS

UK Application No. GB1217231.8 Combined Search and Examination Report, Jan. 25, 2013, 5 pages.

* cited by examiner

*Primary Examiner* — Paul H Masur
*Assistant Examiner* — Michael Phillips
(74) *Attorney, Agent, or Firm* — Anderson Gorecki & Rouille LLP

(57) ABSTRACT

Techniques disclosed herein include systems and methods for extending an IGMP broadcast domain (multicast domain) across a transport network without implementing IGMP snooping within the core of the transport network, yet while providing efficient transport within the core of the transport network. Techniques include dividing a single IGMP interface into multiple IGMP domains or sub-domains. A separate Querier is then elected for each IGMP domain using the single IGMP interface. Edge nodes of the transport network can be configured as the multiple IGMP Queriers, and then re-distribute sender information via a separate routing protocol. Requests can then be sent using the transport network control messaging or routing protocol instead of IGMP snoop messages to advertise multicast data streams in between the multiple IGMP domains (across the transport network). Traffic can then delivered efficiently between isolated access networks of a single Service Layer 2 Network.

18 Claims, 6 Drawing Sheets

USING MULTIPLE IGMP QUERIERS IN A LAYER 2 NETWORK

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices.

Computer networks can transmit data using various distribution models, including multicast transmission. Multicasting is a point-to-multipoint model for delivery of information from one source to a group of destination computers. Typically there is one sender for a particular group of receivers, which can be scattered anywhere on the network. Sometimes there are several senders for many receivers. There are various protocols for implementing multicasting in Internet Protocol (IP) networks. For example, one technology that facilitates multicasting is Internet Group Management Protocol (IGMP). IGMP is typically used by hosts and routers to establish multicast group memberships. Thus, IGMP is essentially a host-connect and host discovery model used for end receivers. Associated with IGMP is IGMP snooping. IGMP snooping is the process of monitoring IGMP network traffic, including IGMP control data IP multicast traffic between hosts and routers. By monitoring IGMP communications, an IGMP snooping device can maintain a map of multicast transmissions and assist in forwarding or refrain from forwarding particular multicast data streams. IGMP is defined by "Request for Comments" (RFC) documents of the Internet Engineering Task Force (IETF).

Computer networks can also include various other types of technology, such as transport networks. Transport networks are typically intermediate networks connecting two or more access/customer networks. Transport networks typically provide transparent data forwarding operations for efficient transmission. There are various types of transport networks. One type of transport network uses technology known as Shortest Path Bridging (SPB). A set of standards for implementing Shortest Path Bridging is generally specified by the Institute of Electrical and Electronics Engineers (IEEE). Specifically, this standard is identified as IEEE 802.1aq. Network services, including SPB services are commonly provided using Ethernet technology. Ethernet has become a default Data Link Layer technology for data transport, that is, the default for Layer 2 (Layer 2) of the Open Systems Interconnection (OSI) model. SPB can expand Ethernet technologies to other or larger networks. For example, a network that uses IEEE 802.1aq SPB can advertise both topology and logical network membership. SPB uses a link state protocol for such advertising.

In an SPB network, packets are encapsulated at an edge node either in Mac-in-Mac 802.1ah or Q-in-Q 802.1ad frames and transported only to other members of the logical network. IEEE 802.1aq supports unicast and multicast, and all routing is on symmetric shortest paths. IEEE 802.1aq includes Shortest Path Bridging MAC (SPBM) functionality. There exist other related technologies that follow the model of a provider network (transport network) that connects two or more customer networks (access networks), where the provider network is functionally distinct from the customer network, even if a single administrator runs both networks.

For example, one technology is Provider Backbone Bridges (PBB) technology. A PBB network is a Layer 2-Bridged network that uses Mac-In-Mac encapsulation to transfer user Layer 2 traffic between two or more Layer 2 networks that are located at the edge of the PBB network (provider network). Note that a PBB network includes all networks that use Mac-In-Mac encapsulation technology, including, but not limited to, networks that use the Shortest Path Bridging Technology commonly referred to as SPB or SPBV or SPBM. The PBB network typically includes a Backbone Edge Bridge (BEB) and a Backbone Core Bridge (BCB). BEBs (also known as provider network edge nodes) function as devices that enable transfer of packets to/from interfaces within the PBB network and to/from interfaces outside the PBB network. BCBs (also known as provider core nodes) enable transfer of packets between interfaces that are within the PBB network. Sender BEBs are also known as Ingress BEBs, while receiver BEBs are also known as Egress BEBs.

A network protocol related to SPB is known as Intermediate System To Intermediate System (IS-IS). IS-IS is a routing protocol that routes data by determining a best route for datagrams transmitted through a packet-switched network. The IS-IS protocol is published by Internet Engineering Task Force (IETF) as an Internet Standard in RFC 1142, as well as in International Organization for Standardization (ISO)/International Electrotechnical Commission (IEC) 10589:2002. SPB Networks can use IS-IS as a control protocol and type-length-value (TLV) structures for control messaging. A TLV structure allows optional information to be encoded within a given packet.

SUMMARY

IGMP snooping is a technique used to prune the amount of multicast traffic in a given network. Pruning increases efficiency of multicast transmissions by causing traffic to be sent towards interfaces where receivers are located, and by causing no transmission of traffic to interfaces where there are no receivers located. IGMP conventionally functions by having receivers (which desire to receive information for IGMP) send a join request. This join request is sent to a logical entity known as a Querier. The Querier is essentially one router on the IGMP interface elected as the Querier from among multiple possible routers configured as IGMP devices. The Querier is designated to receive all multicast traffic that is sent on a specific IGMP interface. Thus, the Querier is defined to see all multicast data streams transmitted via the particular IGMP interface.

The conventional IGMP protocol, including an elected Querier, typically functions well in relatively small networks, such as networks in which all routers can be configured to execute IGMP snooping on the IGMP interface. The IGMP interface is also known as an IGMP broadcast domain, or Layer 2 broadcast domain.

There are challenges, however, with extending such a conventional IGMP broadcast domain across a separate logical network having devices that are not aware of the IGMP domain, such as a transport network. Such separate logical networks include at least some nodes (core nodes) that are not configured to execute IGMP snooping. Such nodes essentially function as "dumb" transport devices that provide very fast and efficient transparent forwarding across the logically separate network. Such nodes are not aware of any IGMP instances or interfaces, nor is it desirable to make such nodes aware of IGMP interfaces. Making such intermediate nodes or core nodes of a transport network aware of IGMP interfaces would result in requiring these core nodes to keep track of state information for hundreds of thousands (or more) of service instances or Service Layer 2 Networks, which could dramatically slow the transport network and even cripple the transport network. Moreover, in typical customer/provider network models, the transport network and "Service Layer 2 Networks" are managed independently. So coordinating service specific IGMP snooping configurations inside a transport network would face operational challenges as well.

The conventional alternative to avoid such IGMP snooping within core devices in the transport network is to flood traffic everywhere within the transport network. That is, core nodes will function essentially as a Layer 2 switch instead of an IGMP-aware node, and simply forward the IGMP sender traffic to all possible nodes and receivers. Such flooding and is a very inefficient use of network bandwidth. Thus, for an IGMP domain to cross a logically separate network, there will either be a state explosion in the core by trying to implement IGMP snooping, or else there will be sub-optimal forwarding within the core of the transport network handling IGMP messaging, which inefficient forwarding can also slow the transport network.

Techniques disclosed herein extend an IGMP broadcast domain (multicast domain) across the transport network without implementing IGMP snooping within the core of the transport network, yet while providing efficient transport within the core of the transport network. Techniques include dividing a single IGMP interface into multiple IGMP domains or sub-domains. A separate Querier is then elected for each IGMP domain using the single IGMP interface. Thus, while conventional IGMP interfaces work with a single Querier, the system herein in functions with multiple Queriers. Edge nodes of the transport network can be configured as the multiple IGMP Queriers, and then re-distribute sender information via some other protocol specific to the transport network, such as IS-IS. Requests can then be sent using the transport network control messaging or routing protocol instead of IGMP snoop messages to advertise multicast data streams in between the multiple IGMP domains (across the transport network). Traffic is then delivered efficiently between islands of a single Service Layer 2 Network (single IGMP interface) interconnected by the transport network and using multiple Queriers located strategically within the virtualized Layer 2 Network.

One embodiment includes a multicast manager that executes a multicast routing process and/or system as a Layer 2 service. The multicast manager executes IGMP snooping at a first data-switching device. IGMP snooping includes monitoring IGMP control messaging and IP multicast traffic. The first data-switching device is configured to forward IP multicast traffic and IGMP control messages via a first IGMP logical interface. The first data-switching device can function as an edge node of a transport network, the first data-switching device also functions as an edge node of a first access network. The first data-switching device connects the first access network to the transport network. The transport network is a logically separate network from the first access network. The transport network forwards data packets using an encapsulation mechanism or other transparent forwarding mechanism. The multicast manager receives an IGMP control message from the first access network. In response, the first data-switching device refrains from forwarding the IGMP control message via the transport network. Alternatively (or in addition), in response to receiving data packets of an IP multicast data stream, the first data-switching device refrains from forwarding the IP multicast data stream into the transport network via the first IGMP logical interface.

In another embodiment, the multicast manager executes IGMP snooping at a first data-switching device as described above. The multicast manager also executes IGMP snooping at a second data-switching device. This second data-switching device is configured to forward IP multicast traffic and IGMP control messages via the first IGMP logical interface (same as the first data-switching device). The second data-switching device functions as an edge node of the transport network. The second data-switching device also functions as an edge node of a second access network. The second data-switching device connects the second access network to the transport network. The multicast manager elects a first node within the first access network as a first IGMP Querier, and elects a second node within the second access network as a second IGMP Querier. The multicast manager also configures IGMP snooping such that the first data-switching device and the second data-switching device both refrain from forwarding IP multicast traffic into the transport network via the first IGMP interface.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: executing IGMP snooping at a first data-switching device, IGMP snooping including monitoring IP multicast traffic and IGMP control messaging, the first data-switching device being configured to forward IP multicast traffic and IGMP control messages via a first IGMP logical interface, the first data-switching device functioning as an edge node of a transport network, the first data-switching device also functioning as an edge node of a first access network, the first data-switching device connecting the first access network to the transport network, the transport network being a logically separate network from the first access network, the transport network forwarding data packets using an encapsulation mechanism; receiving an IGMP control message from the first access network; and in response to receiving the IGMP control message, refraining from forwarding the IGMP control message via the transport network. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting multicast transmission and associated operations. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
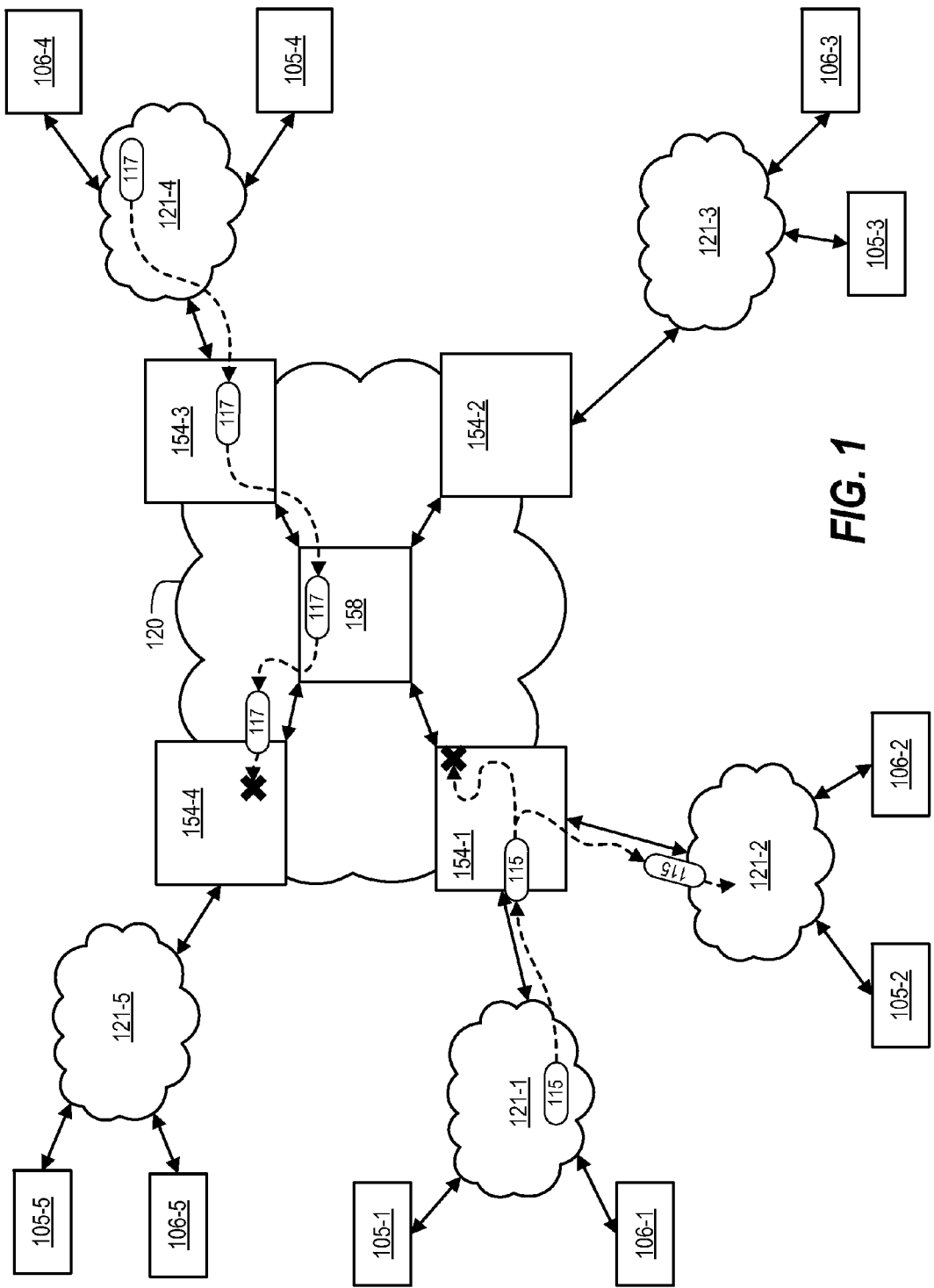
FIG. 1 is a diagram of an IGMP network and a transport network according to embodiments herein.

Techniques disclosed herein include systems and methods that extend an Internet Group Management Protocol (IGMP) broadcast domain (multicast domain) across the transport network without implementing IGMP snooping within the core of the transport network, yet while providing efficient transport within the core of the transport network. Techniques include dividing a single IGMP interface into multiple IGMP domains or sub-domains. A separate Querier is then elected for each IGMP domain using the single IGMP interface.

The IGMP protocol works by electing one single device, connected to a Layer 2 Network, as a Querier. All multicast traffic in the Layer 2 network is sent towards the Querier. Receiver stations connected to the Layer 2 Network broadcast IGMP messages on an IGMP interface connecting them to the Layer 2 Network. These IGMP messages are relayed towards to the Querier by switches and routers between the receiver and the Querier. As the switches and routers relay these messages from receivers for a given multicast stream, they also make note of the interface on which these messages were received. This information is then used to send traffic for a particular multicast stream only over those interfaces on which the switch or the router received the IGMP messages from the receivers in addition to sending the stream towards the Querier. This technique referred to as IGMP snooping enables efficient forwarding of multicast traffic by preventing traffic from being sent on interfaces where the multicast traffic is not required. If a device (switch/router) connected to the Layer 2 Network does not or cannot do IGMP snooping, then such a device will flood received multicast traffic onto all of the interfaces connecting it to the Layer 2 Network, instead of sending this traffic only towards the receivers and the Querier. Thus, not having IGMP snooping devices at transit points in the Layer 2 Network results in inefficient usage of network bandwidth. Conventionally, each Layer 2 Network covered only a few switches and routers, and every device in the Layer 2 network could be used to execute IGMP snooping.

The term Layer 2 Network is used to represent an instance of a Virtual Local Area Network (VLAN), an Emulated Local Area Network (ELAN), Virtual Private LAN Service (VPLS) or a Layer 2 Virtual Services Network (Layer 2VSN) supported over a transport network, such as a PBB network or SPB network. Devices connected to the Layer 2 Network can be switches, routers or end stations. The IGMP protocol is used between end-stations and routers in a Layer 2 Network for efficient delivery of Multicast Traffic. The advent of Layer 2 network virtualization has created challenges for all versions of IGMP.

Virtualization of Layer 2 networks has resulted in islands of "Service Layer 2 Networks" being interconnected by transport networks. This results in a much larger span for the Service Layer 2 Network devices. In such a network landscape, IGMP can often be supported only in the access networks at the edge of the transport network. For technical and administrative reasons, it is conventionally not advisable to support IGMP on devices inside the transport network (core nodes). Following the conventional IGMP model in such networks yields a single IGMP Querier at the edge or of the transport network or inside one of the access networks connecting to the transport network. Sending all multicast traffic toward the Querier would then result in flooding the traffic to all the edges of the transport network where the Service Layer 2 Network has a point of presence. This is because devices in the transport network—through which the multicast traffic passes—cannot execute IGMP snooping on behalf of the Service Layer 2 Network. Efficient solutions for multicast in virtualized environments should prevent unnecessary flooding of multicast traffic in the transport network.

Referring now to FIG. 1, a simplified network diagram illustrates IGMP multicast management techniques as disclosed herein. Transport network 120 includes edge nodes 154, as well as core node 158. Core node (or core nodes) 158 is a data-switching device that transparently forwards data packets, such as by forwarding data packets using header information from an encapsulation header, with underlying headers and payload remaining unchanged. Edge nodes 154 can encapsulate data packets or execute some other transport mechanism in preparation for distribution through the transport network. Each edge node 154 is in communication with one or more access networks 121. Access networks 121 (also known as customer networks) are in turn connected to one or more senders 105, and receivers 106.

Consider for this example that all of access networks 121 are collectively members of a single Layer 2 virtualized service, including having a single IGMP interface. Note that this Layer 2 service is virtualized because access networks are separated by transport network 120, and/or additional intermediate networks (logically separate from the access networks). Techniques include dividing the Layer 2 domain to recognize multiple Queriers within the single Layer 2 virtualized service. Each Querier still operates on a same IGMP interface corresponding to the Layer 2 virtualized service. Whenever a subnet is shared, or a same VLAN is used and virtualized across a transport network, the subnet or VLAN is effectively within a same IGMP interface. This includes transparent Layer 2 connectivity across one or more sites or transport networks. This includes a single Layer 2 broadcast domain across some type of separate intermediate network, an SPB network or Multiprotocol Label Switching (MPLS) network using a VPLS service providing transport network functionality, which can include a point-to-point pseudo wire or PBB network. Thus, techniques disclosed herein can be applied to any transport network that provides transparent Layer 2 connectivity between two or more sites.

By breaking up the IGMP interface into multiple IGMP domains, the system can provide efficient transport within the core of the transport network, yet without having a state explosion within the transport network core. Each IGMP domain has an elected Querier that is recognized as separate. When IGMP snooping is configured on routers connected to the same IGMP network, there is typically an election scheme to select which one router functions as the Querier. For example, some election schemes can select a lowest IP address. The system herein, however, selects multiple Queriers and ensures that each elected querier (per IGMP domain) only knows about its own portion of the IGMP network. This enables a routing protocol to be used in between on the transport network 120. Thus, in spite of the IGMP protocol specifying that the Querier election process results in a single Querier, the system herein elects multiple Queriers on a single IGMP interface, that is, the same Layer 2 broadcast domain.

For example, access networks 121-1 and 121-2 and edge node 154-1 can be members of an IGMP domain with a first elected Querier. Likewise, access network 121-3 and edge node 154-2 can be members of a second IGMP domain with a second elected Querier. Edge nodes 154-3 and 154-4 can each be part of third and fourth IGMP domains, with their corresponding access networks, each having a separate elected Querier. Note that each of the elected Queriers can be a device within a given access network, or can be an edge node of the transport network.

In this example, each of edge nodes 154 is elected to be a Querier of a single IGMP interface. One way to ensure that edge nodes are elected as Queriers is to configure each edge node to have a lowest device IP address relative to device IP addresses of nodes within corresponding attached access networks. Other mechanisms can be used instead to establish that edge nodes are selected as Querier devices.

The IGMP protocol uses IGMP control packets that are typically sent along the IGMP interface towards the Querier. At the Querier/edge node, the edge node identifies the transport network interface, and does not send IGMP control packets into the transport network. In a single querier model such IGMP control messaging would need to be propagated towards the single querier. Neither IGMP queries (joins and leaves) nor membership reports are sent into the transport network. Thus, even though IGMP is turned on at the edge nodes 154, the edge nodes do not forward IGMP messaging into the transport network 120. Each edge node that is functioning as an IGMP Querier is not aware of Queriers at the other edge nodes (from a IGMP point of view.) Effectively, each IGMP domain (access network and edge node combination) is isolated from each other by the transport network.

Note that forwarding still occurs on secondary access networks attached to the edge node. For example, access network 121-1 and/or receiver 106-1 sends an IGMP control message 115 towards Querier/edge node 154-1. Edge node 154-1 then forwards this IGMP message 115 into access network 121-2, but not into transport network 120. Having the edge node elected as Querier can be beneficial in that edge nodes are aware of all the senders at the local domain. Also, to be able to advertise a multicast stream via a separate routing protocol, it is helpful for an edge node to know that a multicast stream exists, and to know the stream exists (or all streams for an IGMP domain) a device needs to be the Querier.

Conventionally IP traffic itself needed to cross the transport network for the Querier (single Querier) to be aware that a given multicast stream exists. With techniques herein, the system can transport control protocol messages of the transport network without requiring multicast traffic to cross in order to advertise multicast data streams. Such techniques transform the discovery from a stream-based presence discovery mechanism to a control message discovery mechanism. Such a technique no longer requires seeing a multicast data stream to know that that the stream exists on the Querier. With independent Querier election, transport network control messages can be used to advertise traffic streams among the multiple Queriers. Thus, a single IGMP interface is broken up into multiple IGMP domains, communicating via a routing protocol.

Typically, IP traffic does not cross IGMP boundaries without first having a route, and a route is not identified without first passing through the Querier. As such, the Querier then performs a routing function to other IGMP interfaces. Conventionally, the IGMP routing function was only used if crossing IGMP domain boundaries, but not within the IGMP domain. With the system herein, however, a routing function is performed even within the IGMP network (the collection of the IGMP domains that are part of a single IGMP interface).

Techniques herein include stopping both IGMP control messaging and IP multicast data traffic at the logical IGMP interface to the transport network. This can include IGMP queries, query replies, membership reports, IGMP leaves, and IGMP data traffic. Normally snoop devices do not send out queries or IGMP reports. Instead, IGMP routing devices (Queriers) send out the queries and IGMP reports. By preventing query messages from being sent into the transport network, the system effectively prevents discover of one or more Queriers across the transport network.

Figure 5:
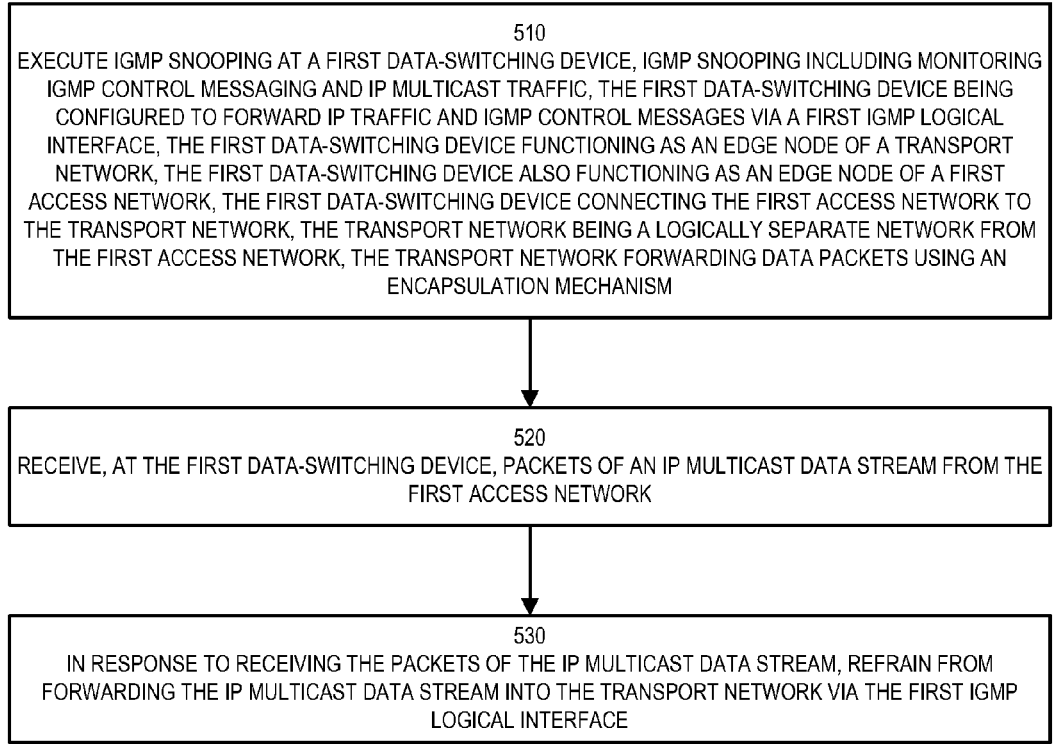
FIG. 5 is a flowchart illustrating an example of a process supporting IGMP multicast management across transport networks according to embodiments herein.
Figure 6:
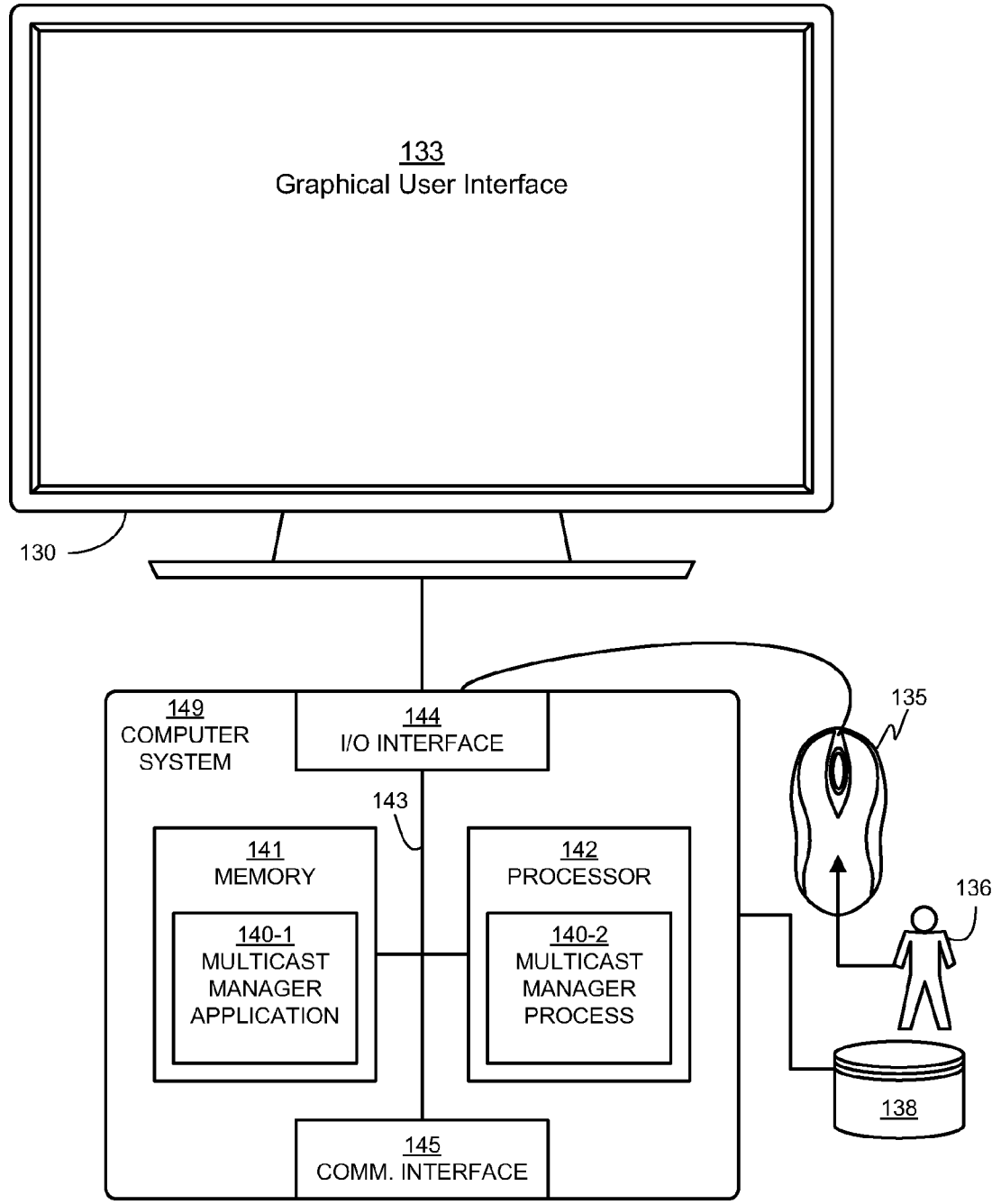
FIG. 6 is an example block diagram of a multicast manager operating in a computer/network environment according to embodiments herein.

FIG. 6 illustrates an example block diagram of a multicast manager 140 operating in a computer/network environment according to embodiments herein. Computer system hardware aspects of FIG. 6 will be described in more detail following a description of the flow charts. Functionality associated with multicast manager 140 will now be discussed via flowcharts and diagrams in FIG. 2 through FIG. 5. For purposes of the following discussion, the multicast manager 140 or other appropriate entity performs steps in the flowcharts.

Figure 2:
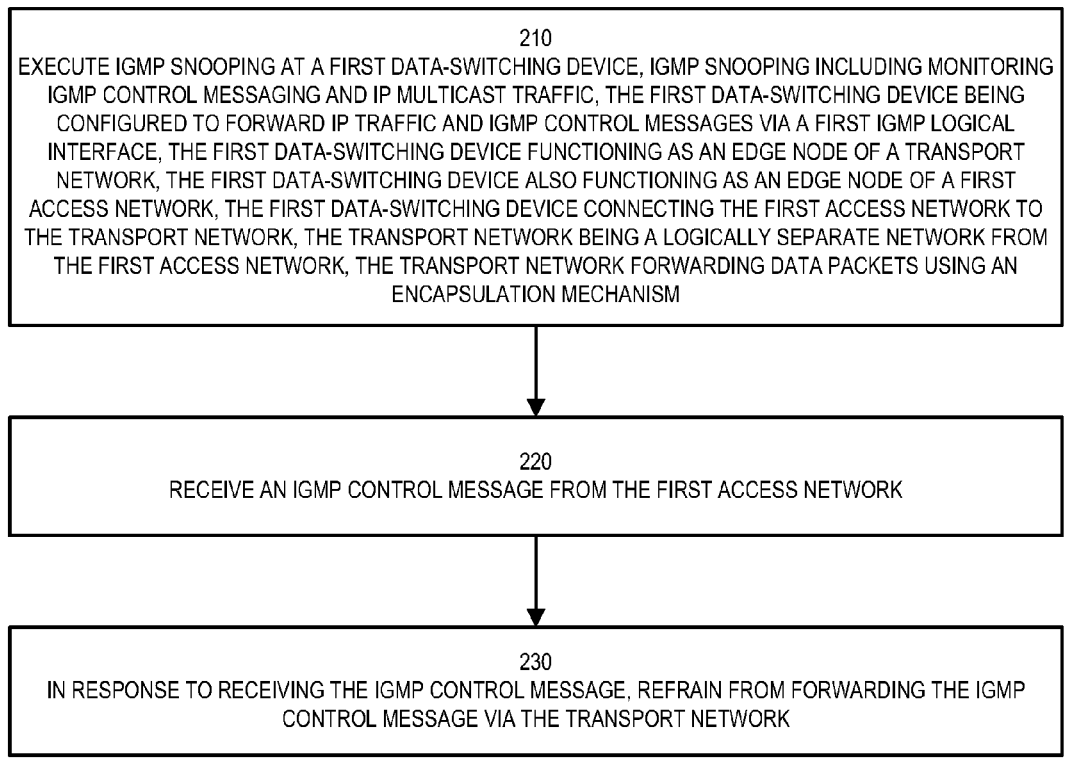
FIG. 2 is a flowchart illustrating an example of a process supporting IGMP multicast management across transport networks according to embodiments herein.

Now describing embodiments more specifically, FIG. 2 is a flow chart illustrating embodiments disclosed herein. In step 210, the multicast manager 140 executes IGMP snooping at a first data-switching device. IGMP snooping includes monitoring IP multicast traffic and control messaging. This first data-switching device is configured to forward IP multicast traffic and IGMP control messages via a first IGMP logical interface, such as part of a specific Layer 2 virtualized network. The first data-switching device functions as an edge node of a transport network, such as a Backbone Edge Bridge of an SPB network. The first data-switching device also functions as an edge node of a first access network. The first data-switching device connects the first access network to the transport network. The transport network is a logically separate network from the first access network. The transport network forwards data packets using an encapsulation mechanism or other transparent forwarding mechanism.

In step 220, the multicast manager 140 receives an IGMP control message from the first access network, such as transmitted from a receiver host device.

In step 230, in response to receiving the IGMP control message, the multicast manager 140 refrains from forwarding the IGMP control message via the transport network, that is, forwarding via the shared IGMP interface.

Figure 3:
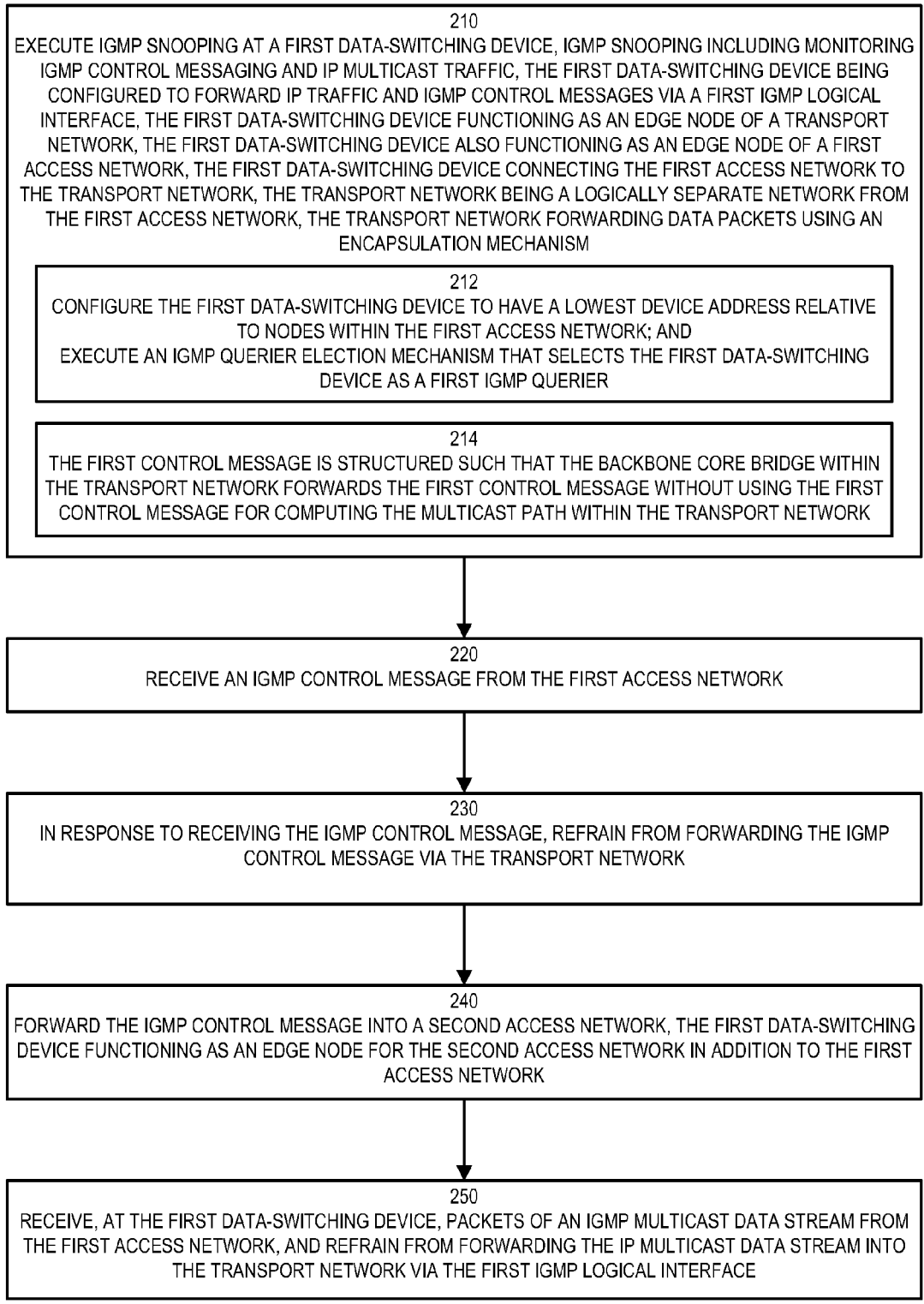
FIG. 3 is a flowchart illustrating an example of a process supporting IGMP multicast management across transport networks according to embodiments herein.

FIG. 3 includes a flow chart illustrating additional and/or alternative embodiments and optional functionality of the multicast manager 140 as disclosed herein.

In step 210, the multicast manager 140 executes IGMP snooping at a first data-switching device. IGMP snooping includes monitoring IP multicast traffic and control messaging. This first data-switching device is configured to forward IP multicast traffic and IGMP control messages via a first IGMP logical interface, such as part of a specific Layer 2 virtualized network. The first data-switching device functions as an edge node of a transport network. The first data-switching device also functions as an edge node of a first access network. The first data-switching device connects the first access network to the transport network. The transport network is a logically separate network from the first access network. The transport network forwards data packets using an encapsulation mechanism or other transparent forwarding mechanism.

In step 212, the multicast manager 140 configures the first data-switching device to have a lowest device address relative to nodes within the first access network, and then executes an IGMP Querier election mechanism that selects the first data-switching device as a first IGMP Querier. In other embodiments, multicast manager 140 can configure the first data-switching device to have a highest device address relative to nodes in the first access network. This can be dependent on a particular IGMP protocol version. For example, IGMPV2 & IGMPV3 typically use a lowest IP address to elect a Querier, while IGMPV1 typically uses a highest IP address.

In step 214, the first data-switching device functions as a first IGMP Querier within a single Layer 2 broadcast domain. This single Layer 2 broadcast domain includes at least one additional IGMP Querier.

In step 220, the multicast manager 140 receives an IGMP control message from the first access network, such as transmitted from a receiver host device.

In step 230, in response to receiving the IGMP control message, the multicast manager 140 refrains from forwarding the IGMP control message via the transport network, that is, forwarding via the shared IGMP interface.

In step 240, the multicast manager 140 forwards the IGMP control message into a second access network. The first data-switching device functions as an edge node for the second access network in addition to the first access network. Thus, there can be two or more access networks sharing the same IGMP division having a corresponding Querier.

In step 250, the multicast manager 140 receives, at the first data-switching device, packets of an IP multicast data stream from the first access network, and, in response, refrains from forwarding the IP multicast data stream into the transport network via the first IGMP logical interface. In other embodiments, the system can export the IGMP control information to a routing protocol of the SPB network and forward the IGMP control information via the transport network to a second data-switching device (that functions as a Backbone Edge Bridge) and a second IGMP Querier within a same Layer 2 broadcast domain. Referring to FIG. 1, data packet 115 can also represent IP multicast traffic received at edge device 154-1 from access network 121-1 using a first IGMP logical interface. Edge device 154-1 can forward this IP multicast traffic into access network 121-2 using this same IGMP logical interface. Edge device 154-1, however, does not forward this IP multicast traffic into the transport network 120 using this IGMP interface. Not forwarding IP multicast traffic 115 into transport network 120 via a logical IGMP interface is illustrated with an "X" in the data path in edge device 154-1.

Figure 4:
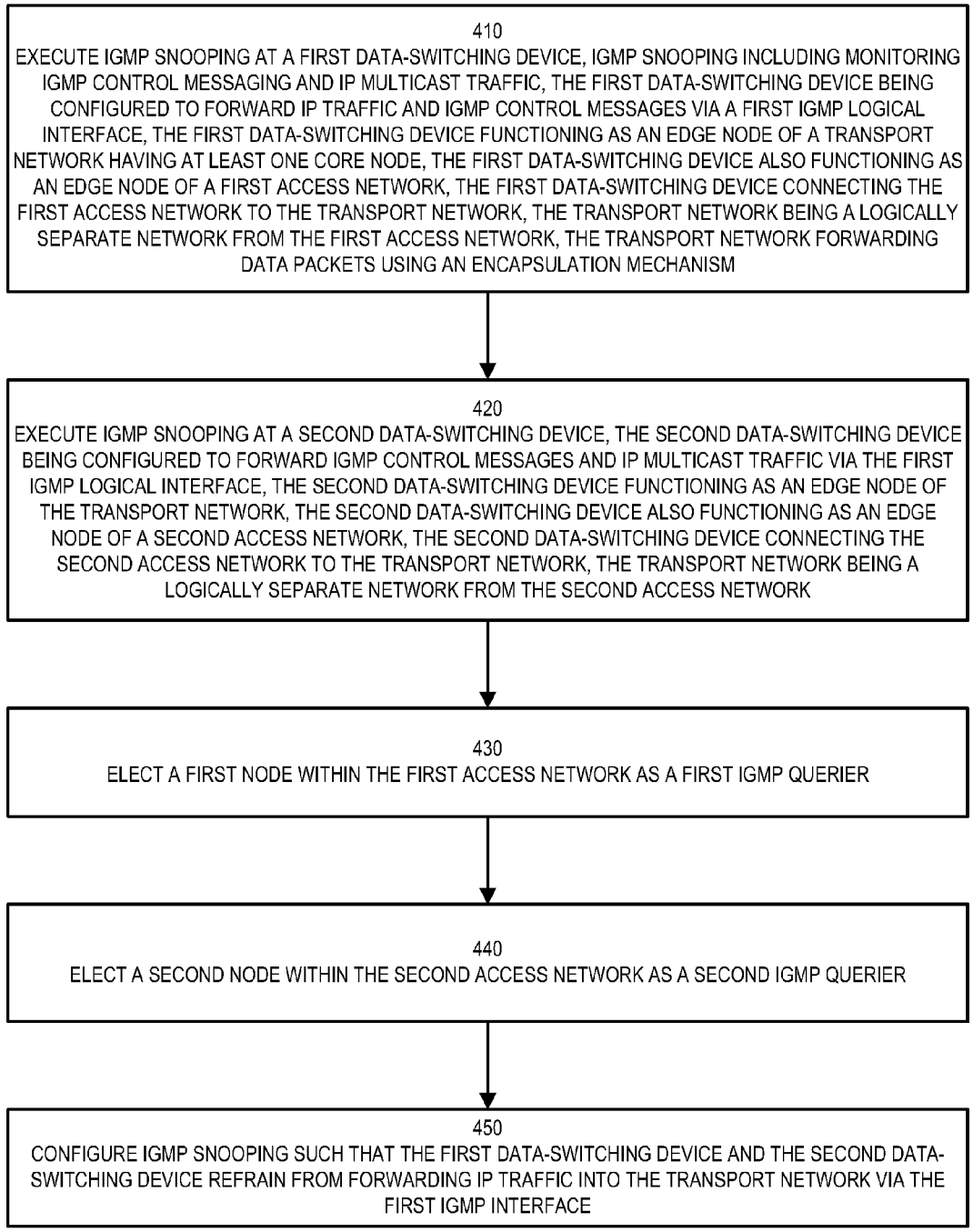
FIG. 4 is a flowchart illustrating an example of a process supporting IGMP multicast management across transport networks according to embodiments herein.

FIG. 4 includes a flow chart illustrating additional and/or alternative embodiments and optional functionality of the multicast manager 140 as disclosed herein.

In step 410, the multicast manager 140 executes IGMP snooping at a first data-switching device. IGMP snooping includes monitoring IP multicast traffic and control messaging. The first data-switching device is configured to forward IP multicast traffic and IGMP control messages via a first IGMP logical interface. The first data-switching device functions as an edge node of a transport network having at least one core node. The first data-switching device also functions as an edge node of a first access network. The first data-switching device connects the first access network to the transport network. The transport network is a logically separate network from the first access network, the transport network forwarding data packets using an encapsulation mechanism.

In step 420, the multicast manager 140 executes IGMP snooping at a second data-switching device. The second data-switching device is configured to forward IP multicast traffic and IGMP control messages via the first IGMP logical interface. The second data-switching device functions as an edge node of the transport network. The second data-switching device also functions as an edge node of a second access network. The second data-switching device connects the second access network to the transport network. The transport network is a logically separate network from the second access network.

In step 430, the multicast manager 140 elects a first node within the first access network as a first IGMP Querier. In step 440, the multicast manager 140 elects a second node within the second access network as a second IGMP Querier. In step 450, the multicast manager 140 configures IGMP snooping such that the first data-switching device and the second data-switching device refrain from forwarding IP multicast traffic into the transport network via the first IGMP interface. Electing the first node within the first access network as the first IGMP Querier can include electing the first data-switching device as the first IGMP Querier. Electing the second node within the second access network as the second IGMP Querier includes electing the second data-switching device as the second IGMP Querier.

FIG. 5 includes a flow chart illustrating additional and/or alternative embodiments and optional functionality of the multicast manager 140 as disclosed herein.

In step 510 the multicast manager 140 executes IGMP snooping at a first data-switching device. IGMP snooping includes monitoring IP multicast traffic and control messaging. This first data-switching device is configured to forward IP multicast traffic and IGMP control messages via a first IGMP logical interface, such as part of a specific Layer 2 virtualized network. The first data-switching device functions as an edge node of a transport network. The first data-switching device also functions as an edge node of a first access network. The first data-switching device connects the first access network to the transport network. The transport network is a logically separate network from the first access network. The transport network forwards data packets using an encapsulation mechanism or other transparent forwarding mechanism.

In step 520, the multicast manager 140 receives, at the first data-switching device, packets of an IP multicast data stream from the first access network. Note that data packets refer to multicast traffic containing payload data.

In step 530, in response to receiving the packets of the IP multicast data stream, multicast manager 140 refrains from forwarding the IP multicast data stream into the transport network via the first IGMP logical interface.

The first data-switching device can further function as a first IGMP Querier within a single Layer 2 broadcast domain, in which the single Layer 2 broadcast domain includes at least one additional IGMP Querier. The system can executes an IGMP Querier election mechanism that selects the first data-switching device as a first IGMP Querier. This election mechanism can include configuring the first data-switching device to have a lowest device address relative to nodes within the first access network. In yet other embodiments techniques can include executing IGMP snooping at a first data-switching device. The IGMP snooping includes monitoring IGMP control messaging and IP multicast traffic. The first data-switching device is configured to forward IP multicast traffic and IGMP control messages via a first IGMP logical interface. The first data-switching device functions as an edge node of a transport network. The first data-switching device also functions as an edge node of a first access network. The first data-switching device connects the first access network to the transport network. The first data-switching device generates an IGMP control message at the first data-switching device. The data-switching device then forwards the IGMP control message into the first access network via the first IGMP logical interface. The data-switching device then refrains from forwarding the IGMP control message into the transport network via the first IGMP logical interface. The first data-switching device can further function as a first IGMP Querier within a single Layer 2 broadcast domain. The single Layer 2 broadcast domain includes at least one additional IGMP Querier.

In an alternative embodiment, the data-switching device receives an IGMP control message at the first data-switching device via the transport network. In response to receiving the IGMP control message, the data-switching device refrains from forwarding the IGMP control message into the first access network. Thus, if an IGMP control message happens to make it through the transport network, the edge node can filter and drop this IGMP control message since the data-switching device already functions as a Querier for its own IGMP subdomain. An example of this technique is shown in FIG. 1. Access network 121-4 sends IGMP control message 117 into access network 120 via an IGMP interface. Core node 158 happens to forward IGMP control message to edge device 154-4. Edge device 154-4, upon identifying that IGMP control message 117 was received via the transport network 120 (instead of from an access network), either drops the message 117, or does not process message 117. Dropping this message or otherwise not processing this message according to IGMP protocol is indicated by an "X" in edge device 154-4.

Continuing with FIG. 6, the following discussion provides a basic embodiment indicating how to carry out functionality associated with the multicast manager 140 as discussed above. It should be noted, however, that the actual configuration for carrying out the multicast manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the multicast manager 140 of computer system 149 to communicate over a network and, if necessary, retrieve any data required to create views, process content, communicate with a user, etc. according to embodiments herein.

As shown, memory system 141 is encoded with multicast manager 140-1 that supports functionality as discussed above and as discussed further below. Multicast manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the multicast manager 140-1. Execution of the multicast manager 140-1 produces processing functionality in multicast manager process 140-2. In other words, the multicast manager process 140-2 represents one or more portions of the multicast manager 140 performing within or upon the processor 142 in the computer system 149.

It should be noted that, in addition to the multicast manager process 140-2 that carries out method operations as discussed herein, other embodiments herein include the multicast manager 140-1 itself (i.e., the un-executed or non-performing logic instructions and/or data). The multicast manager 140-1 may be stored on a non-transitory, tangible computer-readable storage medium including computer readable storage media such as floppy disk, hard disk, optical medium, etc. According to other embodiments, the multicast manager 140-1 can also be stored in a memory type system such as in firmware, read only memory (ROM), or, as in this example, as executable code within the memory system 141.

In addition to these embodiments, it should also be noted that other embodiments herein include the execution of the multicast manager 140-1 in processor 142 as the multicast manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method of managing multicast data transmissions, the computer-implemented method comprising:
   executing Internet Group Management Protocol (IGMP) snooping at a first data-switching device, IGMP snooping including monitoring IGMP control messaging and Internet Protocol (IP) multicast traffic, the first data-switching device being configured to forward IP multicast traffic and IGMP control messages via a first IGMP logical interface, the first data-switching device functioning as an edge node of a transport network, the first data-switching device also functioning as an edge node of a first access network, the first data-switching device connecting the first access network to the transport network, the transport network being a logically separate network from the first access network, the transport network forwarding data packets using an encapsulation mechanism;
   receiving an IGMP control message from the first access network;
   in response to receiving the IGMP control message, refraining from forwarding the IGMP control message via the transport network;
   wherein the first data-switching device is a Backbone Edge Bridge and the transport network is a Shortest Path Bridging network; and
   exporting the IGMP control information to a routing protocol of the SPB network and forwarding the IGMP control information via the transport network to a second data-switching device functioning as a Backbone Edge Bridge and a second IGMP Querier within a same Layer 2 broadcast domain.

2. The computer-implemented method of claim 1, further comprising:
   forwarding the IGMP control message into a second access network, the first data-switching device functioning as an edge node for the second access network in addition to the first access network.

3. The computer-implemented method of claim 1, wherein the first data-switching device further functions as a first IGMP Querier within a single Layer 2 broadcast domain, the single Layer 2 broadcast domain including at least one additional IGMP Querier.

4. The computer-implemented method of claim 1, further comprising:
   executing an IGMP Querier election mechanism that selects the first data-switching device as a first IGMP Querier.

5. The computer-implemented method of claim 1, further comprising:
   receiving, at the first data-switching device, packets of an IP multicast data stream from the first access network; and
   in response to receiving the packets of the IP multicast data stream, refraining from forwarding the IP multicast data stream into the transport network via the first IGMP logical interface.

6. A computer-implemented method of managing multicast data transmissions, the computer-implemented method comprising:
   executing Internet Group Management Protocol (IGMP) snooping at a first data-switching device, IGMP snooping including monitoring IGMP control messaging and Internet Protocol (IP) multicast traffic, the first data-switching device being configured to forward IP multicast traffic and IGMP control messages via a first IGMP logical interface, the first data-switching device functioning as an edge node of a transport network, the first data-switching device also functioning as an edge node of a first access network, the first data-switching device connecting the first access network to the transport network, the transport network being a logically separate network from the first access network, the transport network forwarding data packets using an encapsulation mechanism;
   generating an IGMP control message at the first data-switching device;
   forwarding the IGMP control message into the first access network via the first IGMP logical interface;
   refraining from forwarding the IGMP control message into the transport network via the first IGMP logical interface;
   wherein the first data-switching device is a Backbone Edge Bridge and the transport network is a Shortest Path Bridging network; and
   exporting the IGMP control information to a routing protocol of the SPB network and forwarding the IGMP control information via the transport network to a second data-switching device functioning as a Backbone Edge Bridge and a second IGMP Querier within a same Layer 2 broadcast domain.

7. The computer-implemented method of claim 6, wherein the first data-switching device further functions as a first IGMP Querier within a single Layer 2 broadcast domain, the single Layer 2 broadcast domain including at least one additional IGMP Querier.

8. The computer-implemented method of claim 6, further comprising:
   executing an IGMP Querier election mechanism that selects the first data-switching device as a first IGMP Querier.

9. The computer-implemented method of claim 8, wherein the IGMP Querier election mechanism includes configuring the first data-switching device to have a lowest device address relative to nodes within the first access network.

10. A computer-implemented method of managing multicast data transmissions, the computer-implemented method comprising:

executing Internet Group Management Protocol (IGMP) snooping at a first data-switching device, IGMP snooping including monitoring IGMP control messaging and Internet Protocol (IP) multicast traffic, the first data-switching device being configured to forward IP multicast traffic and IGMP control messages via a first IGMP logical interface, the first data-switching device functioning as an edge node of a transport network, the first data-switching device also functioning as an edge node of a first access network, the first data-switching device connecting the first access network to the transport network, the transport network being a logically separate network from the first access network, the transport network forwarding data packets using an encapsulation mechanism;

receiving an IGMP control message at the first data-switching device via the transport network; and in response to receiving the IGMP control message, refraining from forwarding the IGMP control message into the first access network;

wherein the first data-switching device is a Backbone Edge Bridge and the transport network is a Shortest Path Bridging network; and exporting the IGMP control information to a routing protocol of the SPB network and forwarding the IGMP control information via the transport network to a second data-switching device functioning as a Backbone Edge Bridge and a second IGMP Querier within a same Layer 2 broadcast domain.

11. The computer-implemented method of claim 10, wherein the first data-switching device further functions as a first IGMP Querier within a single Layer 2 broadcast domain.

12. The computer-implemented method of claim 11, wherein refraining from forwarding the IGMP control message into the first access network is also in response to identifying that a second IGMP Querier using the first IGMP logical interface is located across the transport network.

13. A computer-implemented method of managing multicast data transmissions, the computer-implemented method comprising:

executing Internet Group Management Protocol (IGMP) snooping at a first data-switching device, IGMP snooping including monitoring IGMP control messaging and Internet Protocol (IP) multicast traffic, the first data-switching device being configured to forward IP multicast traffic and IGMP control messages via a first IGMP logical interface, the first data-switching device functioning as an edge node of a transport network having at least one core node, the first data-switching device also functioning as an edge node of a first access network, the first data-switching device connecting the first access network to the transport network, the transport network being a logically separate network from the first access network, the transport network forwarding data packets using an encapsulation mechanism;

executing IGMP snooping at a second data-switching device, the second data-switching device being configured to forward IP multicast traffic and IGMP control messages via the first IGMP logical interface, the second data-switching device functioning as an edge node of the transport network, the second data-switching device also functioning as an edge node of a second access network, the second data-switching device connecting the second access network to the transport network, the transport network being a logically separate network from the second access network;

electing a first node within the first access network as a first IGMP Querier;

electing a second node within the second access network as a second IGMP Querier;

configuring IGMP snooping such that the first data-switching device and the second data-switching device refrain from forwarding IP multicast traffic into the transport network via the first IGMP interface;

wherein the first data-switching device is a Backbone Edge Bridge and the transport network is a Shortest Path Bridging network; and exporting the IGMP control information to a routing protocol of the SPB network and forwarding the IGMP control information via the transport network to a second data-switching device functioning as a Backbone Edge Bridge and a second IGMP Querier within a same Layer 2 broadcast domain.

14. The computer-implemented method of claim 13, wherein electing the first node within the first access network as the first IGMP Querier includes electing the first data-switching device as the first IGMP Querier; and wherein electing the second node within the second access network as the second IGMP Querier includes electing the second data-switching device as the second IGMP Querier.

15. A computer-implemented method of managing multicast data transmissions, the computer-implemented method comprising:

executing Internet Group Management Protocol (IGMP) snooping at a first data-switching device, IGMP snooping including monitoring IGMP control messaging and Internet Protocol (IP) multicast traffic, the first data-switching device being configured to forward IP traffic and IGMP control messages via a first IGMP logical interface, the first data-switching device functioning as an edge node of a transport network, the first data-switching device also functioning as an edge node of a first access network, the first data-switching device connecting the first access network to the transport network, the transport network being a logically separate network from the first access network, the transport network forwarding data packets using an encapsulation mechanism;

receiving, at the first data-switching device, packets of an IP multicast data stream from the first access network;

in response to receiving the packets of the IP multicast data stream, refraining from forwarding the IP multicast data stream into the transport network via the first IGMP logical interface; wherein the first data-switching device is a Backbone Edge Bridge and the transport network is a Shortest Path Bridging network; and exporting the IGMP control information to a routing protocol of the SPB network and forwarding the IGMP control information via the transport network to a second data-switching device functioning as a Backbone Edge Bridge and a second IGMP Querier within a same Layer 2 broadcast domain.

16. The computer-implemented method of claim 15, wherein the first data-switching device further functions as a first IGMP Querier within a single Layer 2 broadcast domain, the single Layer 2 broadcast domain including at least one additional IGMP Querier.

17. The computer-implemented method of claim 15, further comprising:

executing an IGMP Querier election mechanism that selects the first data-switching device as a first IGMP Querier.

18. The computer-implemented method of claim 17, wherein the IGMP Querier election mechanism includes configuring the first data-switching device to have a lowest device address relative to nodes within the first access network.

* * * * *